May 20, 1941.  J. G. STEPHENSON  2,242,375
ALTERNATING CURRENT LIMIT ACCELERATION
Filed April 25, 1939
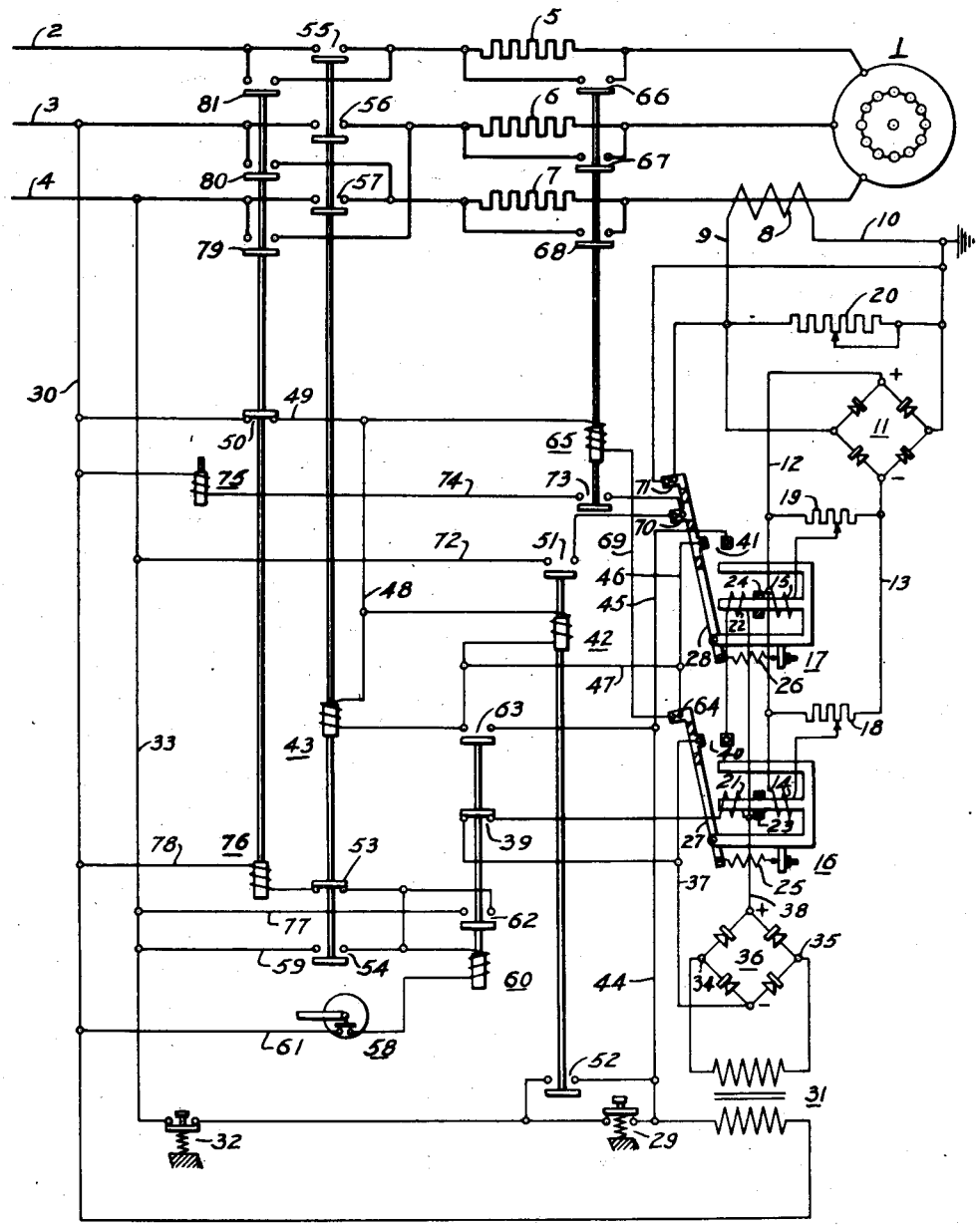
WITNESSES:
N. F. Susser
Wm. J. Ruano
INVENTOR
James G. Stephenson.
BY
Paul E. Friedemann
ATTORNEY Patented May 20, 1941

2,242,375

UNITED STATES PATENT OFFICE 2,242,375

ALTERNATING CURRENT LIMIT ACCELERATION

James G. Stephenson, Wilkinsburg, Pa., assignor to Westinghouse Electric & Manufacturing Company, East Pittsburgh, Pa., a corporation of Pennsylvania Application April 25, 1939, Serial No. 269,947

10 Claims. (Cl. 172—289)

My invention relates to a system of control which is operative by virtue of a change of current in an alternating current system. More specifically, my invention relates to a speed control system for an alternating current motor which is dependent upon the change of current in the motor circuit.

One object of my invention is to provide a control system for initiating control functions, each of which is dependent upon change of current in one common circuit.

A further object of my invention is to provide a control system for an alternating current motor which is basically dependent upon the decrease in current due to acceleration of an alternating current motor which current decrease is effective to shunt resistors in the motor circuit so as to cause further acceleration of the motor or which is effective to provide several steps of acceleration which are sequentially operated by the successive current decrease of different magnitude or, if desired, of the same magnitude in the motor circuit due to acceleration thereof, and which is effective in addition to cause other sequences of operation if desirable for effecting further control functions.

Another object of my invention is to provide a time limit contactor which is dependent upon change of current for its operation rather than upon any mechanical time delay device therefore which provides an automatic and accurate time factor in the control of electrical devices such as an electric motor.

Other objects and advantages will become more apparent from the study of the following specification when considered in conjunction with the accompanying drawing, in which the single figure is a diagrammatic view illustrating my invention and in which:

Numeral 1 denotes an alternating current squirrel cage motor which is fed by an alternating current source of supply through buses 2, 3 and 4, in which are inserted resistors 5, 6 and 7, which are in series with the stator windings of motor 1; also in series with bus 4 is the primary winding of a current transformer 8. The secondary winding of the current transformer is connected through conductors 9 and 10 to the input terminals of a dry contact type of rectifier 11 such as the "copper, copper-oxide" type. The output terminal of the rectifier 11 are connected by means of conductors 12 and 13 to holding coils 14 and 15 of a pair of time delay contactors 16 and 17, respectively. In series with the output terminals of the rectifier and the holding coils 14 and 15 are variable resistors 18 and 19, respectively. Across conductors 9 and 10 emerging from the secondary of the current transformer 8 is a variable resistor 20, the purpose of which is to adjust the voltage developed by the secondary of the current transformer 8. The higher the value of the resistance across the secondary of the current transformer 8, the higher will be the voltage developed thereacross. The time limit contactors 16 and 17 also include main coils 21 and 22, respectively, copper sleeves 23 and 24, respectively, also spring elements 25 and 26, respectively. The purpose of the spring elements 25 and 26 is to bias armatures 27 and 28 of the relays to the position shown in the drawing, that is, separated from the core. The purpose of the copper sleeve element is to absorb a heavy current when the circuit through the main coil is interrupted, which current is in the direction tending to maintain the flux in the core and aramture, thereby tending to hold the armature in the attracted position for a definite period of time after the main coil has become deenergized. The principle of operation of the time limit contactors 16 and 17 is set forth in greater detail in a U. S. patent to W. Schaelchlin et al., No. 1,979,709, patented November 6, 1934. There is, however, one difference in the connection of the main and holding coils in the patent as distinguished from those in the present application and that difference is that the main and holding (i. e., neutralizing) coil of the patent are connected in opposition to each other, thereby developing fluxes tending to neutralize each other, whereas the main and holding coils in the present application are wound in the same direction and thereby aid each other in holding the armature in the attracted position. The basic principle of the present invention lies in the sequential weakening of holding coils 14 and 15 to such an extent that armatures 27 and 28 can no longer be held attracted, thereby causing successive drop-outs of the armatures which in turn cause successive operation of various contact elements associated with the respective armatures to effect a sequence of control operations.

The relative drop-out values of holding coils 14 and 15 may be adjusted by varying the resistors 18 and 19. The values of resistors 18 and 19 are so selected that for a given current decrease in the primary of the current transformer 8, the voltage across holding coil 14 will decrease to such a value as to be no longer effective in holding armature 27 in attracted position, whereas the voltage simultaneously impressed on coil 15 is still sufficient to hold armature 28 in the attracted position. The drop-out of holding coil 14 will effect a shunting of resistors 5, 6 and 7 which will cause further acceleration of motor 1 and a renewed decrease of current as a result of such acceleration, this latter current decrease being effective to cause dropping out of holding coil 15 which will effect a further control operation such as energization of a solenoid, all of which will be described in detail hereinafter.

The operation of the device is as follows: When the start push button of switch 29 is depressed, thus bridging the contact members thereof, a circuit is established from one of the phases of the alternating current source, that is from bus 3 to conductor 30, primary winding of transformer 31, start push button switch 29, stop push button switch 32, conductor 33 to bus 4. The secondary of transformer 31 is connected across input terminals 34 and 35 of a dry contact type rectifier 36, while the output terminals thereof are connected through conductors 37 and 38 to main coil 21 and contact members 39 forming a series circuit. Energization of main coil 21 effects attraction of armature 27 to the core and the closure of contact members 40 which, in turn, effects a parallel connection of main coil 22 with main coil 21. Energization of main coil 22 causes the attraction of armature 28 and the closure of contact members 41, the latter completing a circuit through the actuating coils of relays 42 and 43. The above circuit may be traced as follows: From conductor 33 to the bridged contact members of stop push button switch 32 and start push button switch 29, conductors 44 and 45, contact members 41, conductors 46 and 47, thence following two parallel paths, one through the actuating coil of relay 42 and the other through the actuating coil of relay 43, the two paths joining at conductor 48, thence to conductor 49, contact members 50 and finally to conductor 30. Energization of the actuating coil of relay 42 will cause an upward movement of its armature resulting in the bridging of contact members 51 and 52. The bridging contact 51 has no immediate effect but the bridging of contact members 52 forms a parallel circuit across the start push button switch 29, so that upon subsequent release of push button 29 causing opening of its contact members a circuit will still be complete across contact members 52 so long as the actuating coil of relay 42 remains energized.

Energization of the actuating coil of relay 43 will cause upward movement of its armature resulting in the opening of contact members 53 and the closing of contact members 54 and the closing of line contactors 55, 56 and 57. The closing of the line contactors effects the completion of the circuit from buses 2, 3 and 4 to motor 1 through resistors 5, 6 and 7 which effects starting of motor 1. As soon as the rotor of motor 1 begins to rotate, a "zero-speed" switch 58 will close its contact members. In other words, switch 58 is mounted on the rotor of motor 1 and is responsive to rotation of the rotor to close its contact members as soon as the rotor starts to rotate and conversely when the rotor of motor 1 comes to a stop, the contact members of "zero-speed" switch 58 automatically open. Thus as the rotor of motor 1 begins to rotate, thus closing contact members of speed switch 58, a circuit is completed from conductor 33 to conductor 59, contact members 54, actuating coil of control relay 60, contact members of "zero-speed" switch 58 and conductor 61 to conductor 30. Energization of control relay 60 effects closure of contact members 62 and 63 and opening of contact members 39. As motor 1 accelerates, the current through buses 2, 3 and 4 gradually decreases. Consequently, the current passing through the primary of the current transformer 8 decreases, thus causing a decrease in voltage across the secondary thereof and across both of the holding coils 14 and 15. This decrease continues until holding coil 14 no longer has a sufficient energy to keep armature 27 in its attracted position, thereby causing a dropping out thereof by the aid of spring 25 whereas holding coil 15 still has sufficient energy to hold armature 28 in its attracted position.

This dropping out of armature 27 effects closure of contact members 64 which, in turn, closes a circuit through accelerating relay 65 which causes closure of contact members 66, 67 and 68 which shunt resistors 5, 6 and 7, respectively, thereby effecting further acceleration of motor 1.

The above mentioned circuit may be traced as follows: From conductor 33, stop push button switch 32, start push button switch 29, conductors 44 and 45, contact members 41, conductor 46, contact members 64, conductor 69, actuating coil of relay 65, conductor 49, contact members 50 to conductor 30. As the current through the primary of the current transformer 8 decreases as the result of further acceleration thereof due to shunting of resistors 5, 6 and 7, it will finally reach a value which results in a decreased voltage across holding coil 15 which is no longer sufficient to keep armature 28 in the attracted position, therefore, allowing it to drop out into the position shown in the drawing. It will be noted that the main coil 22 is no longer energized due to the opening contact members 40.

The drop out of armature 28 will, of course, be delayed by virtue of the current induced in the copper sleeve 24. As a matter of fact, holding coils 14 and 15 may be adjusted so as to have the same potential thereacross instead of different potentials because successive drop out of armatures 27 and 28 may still be obtained due to the delay in the drop out of armature 28 by virtue of copper sleeve 24 even after armature 27 opens contact members 40. This delay allows time for resistors 4, 5 and 6 to become shunted and for the current to increase again so as to supply holding coil 15 with sufficient added voltage to enable it to continue to hold armature 28. As soon as the armature 28 has dropped out, it will effect closure of contact members 70 and 71. The closure of contact members 70 closes a circuit from conductor 33 to conductor 72, contact members 51, contact members 70, contact members 73, conductor 74, holding solenoid 75 to conductor 30. The holding solenoid 75 may be effective to secure any control operation desired, for example, to secure a further accelerating step by shunting other resistors similar to resistors 5, 6 and 7 in buses 2, 3 and 4 (not shown) or to apply energy to release a brake which is of the spring operated magnetic release type (not shown) or for any other control operation desired.

In order to stop the rotation of motor 1, stop push button of switch 32 is depressed, thereby deenergizing transformer 31 and the actuating coils of relays 42 and 43, the former resulting in the opening of contact members 51 and 52, while the latter resulting in the opening of contact members 54, 55, 56 and 57 and the closing of contact members 53; the latter effecting completion of a circuit through the plugging or reversing relay 76. The latter circuit can be traced as follows: From conductor 33 to conductor 77, contact members 62, contact members 53, plugging relay 76, conductor 78 to conductor 30. Energization of plugging relay 76 causes opening of contact members 50, thus deenergizing the accelerating relay 65 which, in turn, causes opening of contact members 66, 67 and 68. Actuation of plugging relay 76 also causes closure of phase shifting contact members 79, 80 and 81, thereby causing a reversal of phase sequence from the buses 2, 3 and 4 and motor 1 which tends to effect the reversal of rotation of motor 1. Of course, motor 1 is still running in the forward direction so the direct result of plugging of the circuit is to cause a comparatively rapid deceleration of motor 1.

As the rotor of motor 1 approaches zero speed, the "zero-speed" switch 59 automatically opens, thereby opening the circuit through the actuating coil of control relay 60, thus causing opening of contact members 62 which, in turn, results in the interruption of the circuit established through plugging or reversing relay 76. At this point all of the devices embodied in the control scheme are deenergized and remain so until start push button 29 is again depressed to again start motor 1 and repeat the cycle described above.

It will be noted that by employing the idea of current limit acceleration an ideal type of acceleration is produced, inasmuch as the time factors involved for separate accelerating steps are no longer dependent upon mechanical devices such as dashpots and the like which are supposed to have definite time interval of operation but which may vary due to wear or otherwise, thereby giving erroneous or undesirable time factors. In accordance with my invention the time factor is automatically established and exactly follows the decrease in current in the motor circuit. Hence there is no possibility of error in the time factor for successive accelerating steps or for successive control functions.

While motor 1 is described as being a squirrel cage motor using primary resistance, it is obvious that it may equally be a wound rotor motor using secondary resistance or in fact may be any type of alternating current motor whose speed is dependent upon change of resistance. Furthermore, the scheme described above is not confined to the above described pair of sequences (that is, one being for accelerating the motor and the other being to energize a solenoid) but may equally well be used for initiating other sequences which depend upon the primary in a circuit that for any reason changes and due to which change it is desired to initiate other sequences. In other words, broad application may be made to a control system which does not include a motor or accelerating resistors but which may be any control scheme in which successive decreases of current of different magnitudes will cause a sequence of control operations of any character whatsoever.

I am, of course, aware that others, particularly after having had the benefit of the teachings of my invention, may devise other control systems embodying my invention, and I, therefore, do not wish to be limited to the specific showings made in the drawing and the descriptive disclosure hereinbefore made but wish to be limited only by the scope of the appended claims and such prior art that may be pertinent.

I claim as my invention:

1. In a speed control system for an electric motor, including, in combination, an alternating current motor, a power source therefor including a plurality of power lines, a resistance in each of said power lines in series with said motor for controlling the speed thereof, a current transformer comprising primary and secondary windings, the primary being in series with one of said lines, a rectifier in circuit relationship with said secondary, a pair of relays which are fed at least in part by direct current from said rectifier, one of said relays being responsive as the result of decrease in current in said current transformer caused by acceleration of said motor to shunt said resistances thereby effecting further increase in speed of said motor, the other relay being responsive solely to decrease in current in said motor caused by said further increase in speed to effect a further control function, each of said relays including a variable resistor for adjusting their respective relative responsiveness.

2. In a speed control system for an electric motor, including, in combination, an alternating current motor, a power source therefor including a plurality of power lines, a resistance in each of said power lines in series with said motor for controlling the speed thereof, a current transformer comprising primary and secondary windings, the primary being in series with one of said lines, a rectifier in circuit relationship with said secondary, and a pair of relays which are fed at least in part by direct current from said rectifier, one of said relays being responsive as the result of decrease in current in said current transformer caused by acceleration of said motor to shunt said resistances thereby effecting further increase in speed of said motor, the other relay being responsive solely to decrease in current in said motor caused by said further increase in speed to effect a further control function, each of said relays comprising a magnetic core, a main coil, a holding coil, and means for opening the circuits of the main coils, said relays also including means for delaying the collapse of flux in said core as the result of opening of a circuit through said main coils.

3. In a speed control system for an electric motor, including, in combination, an alternating current motor, a power source therefor including a plurality of power lines, a resistance in each of said power lines in series with said motor for controlling the speed thereof, a current transformer comprising primary and secondary windings, the primary being in series with one of said lines, a rectifier in circuit relationship with said secondary, a pair of relays which are fed at least in part by direct current from said rectifier, one of said relays being responsive as the result of decrease in current in said current transformer caused by acceleration of said motor to shunt said resistances thereby effecting further increase in speed of said motor, the other relay being responsive solely to decrease in current in said motor caused by said further increase in speed to effect a further control function, means for stopping said motor including a "stop" switch, a phase reversing means on said power lines, and a speed responsive switch on said motor, said "stop" switch being effective to operate said phase reversing means to reverse the phase relationship of said lines thereby tending to reverse the direction of rotation of said motor and decreasing the speed thereof, said speed responsive switch being effective as the result of said last mentioned decrease of speed of said motor and at substantially zero speed to open the circuit through said power lines thus stopping said motor.

4. In a speed control system for an electric motor, including, in combination, an alternating current motor, a power source therefor including a plurality of power lines, a resistance in each of said power lines in series with said motor for controlling the speed thereof, a current transformer comprising primary and secondary windings, the primary being in series with one of said lines, a rectifier in circuit relationship with said secondary, a pair of relays which are fed at least in part by direct current from said rectifier, one of said relays being responsive as the result of decrease in current in said current transformer caused by acceleration of said motor to shunt said resistances thereby effecting further increase in speed of said motor, the other relay being responsive solely to decrease in current in said motor caused by said further increase in speed to effect a further control function, each of said relays comprising a magnetic core, a main coil, a holding coil and means for delaying the collapse of flux in said core as the result of opening of a circuit through said main coil, a second rectifier which is connected across one of the phases of said power lines for providing direct current to said main coils, said holding coils being fed from said first mentioned rectifier, switching means associated with each of said relays and which are held in one position when said relays are energized and in another position when said main coils are deenergized and said holding coils are weakened as the result of decrease in current in said current transformer, said relays being responsive to different values of said current decrease thereby being sequentially operative to effect sequential control operations.

5. In a speed control system for an electric motor, in combination, a source of alternating current having supply lines, an alternating-current motor having primary windings for connection to said supply lines and having secondary windings, switching means for connecting said primary windings to said supply lines, resistance means connected in series relation with said supply lines and said primary windings and disposed between the primary windings and said switching means, control switching means for shunting said resistance means to thus control the voltage impressed on said primary windings and thereby control the speed of said motor, an electromagnetic time limit relay, means responsive to a predetermined current value in the primary windings for deenergizing said relay whereby said relay is caused to operate a definite time after the current in the said primary windings has attained said predetermined current value, and means responsive to the operation of said time limit relay adapted to cause operation of said control switching means.

6. In a speed control system for an electric motor, in combination, a source of alternating current having supply lines, an alternating-current motor having primary windings for connection to said supply lines and having secondary windings, switching means for connecting said primary windings to said supply lines, resistance means connected in series relation with said supply lines and said primary windings and disposed between the primary windings and said switching means, control switching means for shunting said resistance means to thus control the voltage impressed on said primary windings and thereby control the speed of said motor, an electromagnetic time limit relay responsive to a predetermined current value in said primary winding and operable a definite time after said predetermined current value flows in said primary winding, and means actuated by said relay for effecting the operation of said control switching means.

7. In a speed control system for an electric motor, in combination, a source of alternating current having supply lines, an alternating-current motor having primary windings for connection to said supply lines and having secondary windings, switching means for connecting said primary windings to said supply lines, resistance means connected in series relation with said supply lines and said primary windings and disposed between the primary windings and said switching means, control switching means for shunting said resistance means to thus control the voltage impressed on said primary windings and thereby control the speed of said motor, a current transformer having a primary winding connected in series with the primary winding of the said motor, and having a secondary winding, an adjustable resistor connected across the secondary winding of the current transformer to adjust the terminal voltage of the transformer, a rectifier connected to the transformer secondary winding, a pair of time limit relays connected in the rectifier output circuit, one of said relays being responsive to one given voltage value and the other responsive to another given voltage value on the direct-current terminals of the rectifier, means responsive to the operation of one of said relays to cause operation of said control switching means and to alter the circuit arrangement of the second time limit relay to effect operation of the second time limit relay, and means responsive to the operation of the second time limit relay for effecting a further control function.

8. In a speed control system for an electric motor, in combination, a source of alternating current having supply lines, an alternating-current motor having primary windings for connection to said supply lines and having secondary windings, switching means for connecting said primary windings to said supply lines, resistance means connected in series relation with said supply lines and said primary windings and disposed between the primary windings and said switching means, control switching means for shunting said resistance means to thus control the voltage impressed on said primary windings and thereby control the speed of said motor, a control circuit comprising a push-button switch, a voltage transformer, a rectifier, a relay having an actuating coil, a second similar relay having an actuating coil, said control circuit being so interconnected with said source of alternating current that operation of said push-button switch causes energization of said voltage transformer and thus energization of the rectifier and thus the actuating coil of the first recited relay to cause it to pick up, means responsive to the pick-up of said first relay adapted to connect the actuating coil of the second relay to the rectifier to cause the second relay to pick up, means responsive to the pick-up of the second relay adapted to cause the operation of the switching means to thus connect the motor primary to the source of alternating current, a zero speed switch responsive to motor operation adapted to open the circuit for the actuating coil of the first relay, means responsive to the current in the motor primary adapted to delay the drop-out of the relay a short interval of time, means responsive to the drop-out of the relay adapted to effect the operation of the control switching means and to effect the deenergization of the actuating coil of the second relay, means responsive to the current in the motor primary adapted to delay the drop-out of the second relay a short interval of time, and means responsive to the drop-out of the second relay.

9. In a speed control system for an electric motor, in combination, a source of alternating current having supply lines, an alternating-current motor having primary windings for connection to said supply lines and having secondary windings, switching means for connecting said primary windings to said supply lines, resistance means connected in series relation with said supply lines and said primary windings and disposed between the primary windings and said switching means, control switching means for shunting said resistance means to thus control the voltage impressed on said primary windings and thereby control the speed of said motor, a source of constant voltage direct current, a source of direct current having a voltage varying with the current in the primary windings of the motor, a time limit relay having an actuating coil and a holding coil, means for effecting, in sequence, the energization of the actuating coil from the constant voltage direct current to cause said relay to pick up, and the operation of said switching means, means responsive to the motor operation for effecting deenergization of the actuating coil whereby said holding coil, which is connected to the variable voltage source of direct current, prevents drop-out of said relay until a definite interval of time after the current in the motor primary winding has decreased to a given value, and means responsive to the drop-out of said relay for effecting the operation of said control switching means.

10. In a speed control system for an electric motor, in combination, a source of alternating current having supply lines, an alternating-current motor having primary windings for connection to said supply lines and having secondary windings, switching means for connecting said primary windings to said supply lines, resistance means connected in series relation with said supply lines and said primary windings and disposed between the primary windings and said switching means, control switching means for shunting said resistance means to thus control the voltage impressed on said primary windings and thereby control the speed of said motor, a source of constant voltage direct current, a variable voltage source of direct current connected to the motor primary windings to be responsive in voltage to the current in the motor primary windings, a time limit relay having an actuating coil and a holding coil, said holding coil being connected to the variable voltage source of direct current, means for effecting in sequence the energization of the said actuating coil from the source of constant voltage direct current to cause said relay to pick up, and the operation of said switching means to energize the motor, means responsive to operation of the motor for deenergizing the actuating coil whereby said holding coil prevents drop-out of said relay until after the current in the motor primary winding has decreased to a given value, a second time limit relay having an actuating coil connected to be energized from the constant voltage source of direct current by the pick up of the first relay, and deenergized by the drop-out of the first relay, said second relay having a holding coil connected to the variable voltage direct current whereby said second relay is prevented from dropping out until the current in the motor primary winding decreases to a given value, means responsive to the drop-out of the first relay for effecting the operation of the control switching means, and electric means responsive to the drop-out of the second relay for effecting a further control function.

JAMES G. STEPHENSON.